Figure 1:
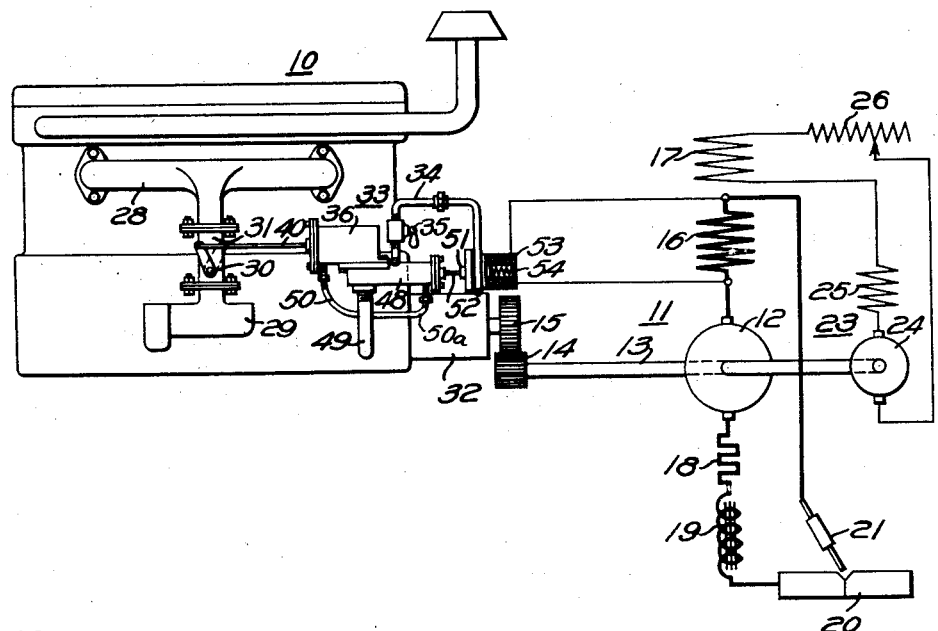

Feb. 12, 1935.  J. H. BLANKENBUEHLER  1,991,073

INTERNAL COMBUSTION ENGINE SPEED CONTROLLER

Filed Aug. 6, 1932

WITNESSES:

INVENTOR
John H. Blankenbuehler.
ATTORNEY

Patented Feb. 12, 1935

1,991,073

UNITED STATES PATENT OFFICE 1,991,073

INTERNAL COMBUSTION ENGINE SPEED CONTROLLER

John H. Blankenbuehler, Edgewood, Pa., assignor to Westinghouse Electric & Manufacturing Company, East Pittsburgh, Pa., a corporation of Pennsylvania Application August 6, 1932, Serial No. 627,791

4 Claims. (Cl. 290—40)

My invention relates, generally, to internal combustion engines and particularly to apparatus for controlling the speed of internal-combustion engines.

When an internal-combustion engine is used for driving an arc welding generator, air compressor or the like in which an intermittent load is applied to the engine because of the nature of the work generally performed by such apparatus, it is desirable to provide means for controlling the speed of the engine in accordance with the variation of the load. When the load is applied, it is desirable that the speed of the engine be increased from idling speed to full speed very rapidly.

When the load is removed, however, it is desirable to maintain the engine at full speed for a definite time for the reason that the load may be reapplied within the definite time. In a system provided with a definite time delay for the shutting down of the engine, the rapid hunting from full speed to idling speed is avoided and full power is available for continuing operations at any instant within the time interval for which the apparatus is set.

Heretofore attempts have been made to obtain the desired control of the speed of an internal-combustion engine used to drive an intermittent load by means of vacuum or suction devices which are operated in conjunction with the carburization system of the engine. These devices operate in somewhat the same general manner as vacuum-controlled windshield wipers and the like that are used in connection with motor vehicles.

Devices of this nature have the disadvantage that they tend to interfere with the operation of the carburization system and thereby, interfere with the efficient and satisfactory operation of the engine. They have the further serious disadvantage that they are inherently difficult to adjust and maintain in a predetermined operating condition.

The difficulty in obtaining proper adjustment is due to the variation in air pressure exerted by the atmosphere and further, because of the compressibility of the gaseous medium which is used to effect the desired control function. For a given setting of the apparatus, widely varying results may be obtained because of conditions over which an operator has little or no control. It is, therefore, difficult to use the apparatus and, in some instances, the difficulties over-balance its advantages and render the speed-control apparatus practically worthless.

It is an object of my invention, generally stated, to provide speed control apparatus for an internal-combustion engine which shall be simple, efficient and accurate in operation and which may be readily and economically manufactured and installed.

A more specific object of my invention is to provide for controlling the speed of an internal-combustion engine in accordance with a characteristic of the load driven by the engine.

Another object of my invention is to provide for maintaining an internal-combustion engine at full speed for a predetermined time after the load is removed from the engine.

Still another object of my invention is to provide for maintaining an internal-combustion engine at full speed for a predetermined regulatable time after the load is removed from the engine.

A further object of my invention is to provide for positively maintaining an internal-combustion engine at full speed for a predetermined regulatable time interval after the load is removed from the engine independently of atmospheric conditions and variations in the medium used for effecting the control of the speed.

A still further object of my invention is to provide for applying fluid pressure to effect the positive control of the fuel regulator for an internal-combustion engine in a predetermined manner as a function of the load driven by the engine.

Other objects of my invention will, in part, be obvious and, in part appear hereinafter.

My invention, accordingly, is disclosed in the embodiment hereof shown in the accompanying drawing, and comprises the features of construction, combination of elements and arrangement of parts which will be exemplified in the construction hereinafter set forth, and the scope of the application of which will be indicated in the appended claims.

Figure 2:
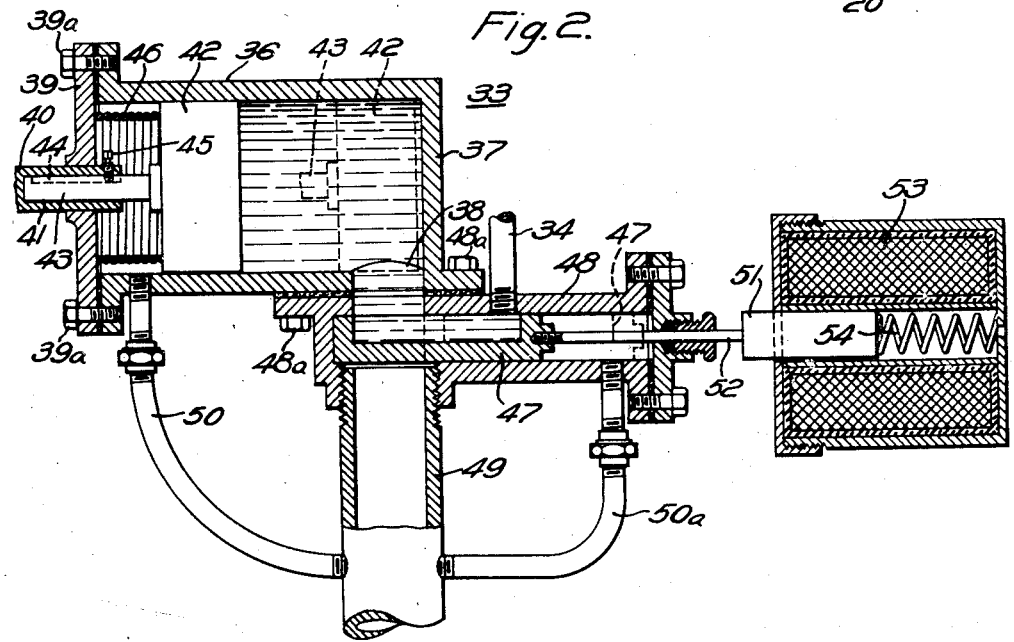

For a more complete understanding of the nature and scope of my invention, reference may be had to the following detailed description taken in connection with the accompanying drawing, in which;

Figure 1 is a view, in side elevation, of one embodiment of the invention showing how it may be utilized in conjunction with an arc welding system, certain parts being broken away to more clearly illustrate the construction; and Fig. 2 is an enlarged cross-sectional view of the speed controlling device shown in Fig. 1.

Referring now to Fig. 1 of the drawing, the apparatus there shown comprises an engine, illustrated generally at 10, which may be of the internal-combustion type. The engine 10 is arranged to drive a load which may comprise a welding generator shown generally at 11. While a welding generator 11 is illustrated as being driven by the engine 10, it will be readily understood that any other load which has somewhat similar characteristics to that of the load provided by a welding generator may be used in practicing the invention.

As illustrated in the drawing, the welding generator 11 comprises an armature 12 which is mounted on a shaft 13 that has driving connection with the engine 10 through gears 14 and 15. The welding generator 11 may be of the differential compound type and may be also provided with a differential series field winding 16 and a separately-excited main field winding 17.

The armature 12 and the series field winding 16 are connected in series circuit relation, as is customary, to the welding circuit which may comprise a stabilizing resistor 18, an inductance coil 19, work 20 on which the welding operation is to be performed and a welding electrode 21 which may be of any of the types well known in the art.

In order to provide for energizing the main field winding 17, an exciter-generator shown generally at 23 is provided. The exciter-generator 23 comprises an armature 24 which is mounted on the shaft 13 and is driven by means of the engine 10. The exciter-generator 23 may be of the series type and may be provided with a series field winding 25, as illustrated. In order to regulate the current flow in the main field winding 17 from the exciter-generator 23, a rheostat 26 is provided and is connected in series circuit relation with the series field winding 25 and armature 24, as shown.

The engine 10 is provided with the usual manifold 28 and carburetor 29. In order to control the flow of fuel from the carburetor 29 to the manifold 28 a throttle valve 30 is provided in a suitable connection member 31 located between the carburetor 29 and the manifold 28 as illustrated. The throttle valve 30 is of the usual butterfly type which is commonly used for controlling the flow of fuel to internal-combustion engines.

As illustrated in the drawing, the throttle valve 30 is in the idling speed position at which position only sufficient fuel is permitted to pass into the manifold 28 to maintain the engine 10 operating at a desirable idling speed. When the throttle valve 30 is moved to the dotted position, as illustrated, sufficient fuel is permitted to flow into the manifold 28 from the carburetor 29 to maintain the engine 10 at the full speed to provide for driving the generator 11 under full-load operating conditions.

The engine 10 is also provided with an oil pump 32 which is used to provide suitable lubrication for the various bearings and moving parts of the engine 10 as is well known in the art. The oil pump 32 is of the usual type which maintains a substantially constant oil presure over a wide range of speed of the engine by means of which it is driven. In addition to the use of the oil pump 32 for providing suitable lubrication for the engine 10, it is also used to provide suitable fluid pressure for controlling the speed of the engine 10 as will be set forth in detail hereinafter.

In order to control the speed of the engine 10 in accordance with the load which is driven thereby, an automatic speed controller, shown generally at 33, is provided. The speed controller 33 is arranged to be operated by means of oil pressure which is obtained from the oil pump 32 by means of the pipe connection 34 which is of a relatively small diameter as illustrated. In order to regulate the flow of oil through the connection 34, a manually-operable valve 35 is provided in the pipe connection 34 to vary the rate at which the oil is permitted to flow from the oil pump 32 into the speed controller 33.

As is more clearly shown in Fig. 2 of the drawing, the speed controller 33 comprises a cylinder 36 having a closed end 37 and a relatively large side opening 38. A cap 39 is provided to close the open end of the cylinder 36 and is secured in position by means of suitable bolts 39a as illustrated.

A connection with the throttle valve 30 is obtained by means of a rod 40 which is slidably disposed in a suitable opening in the cap 39 and is connected to the throttle valve at one end, as illustrated. The other end of the rod 40 is provided with a cylindrical opening 41. A piston 42 is slidably disposed within the cylinder 36 and is provided with a shank 43 loosely fitting within the opening 41. A slot 44 is provided in the shank 43 and a screw 45 is mounted near the inner end of the rod 40 to slidably engage the slot 44.

It will be observed that the piston 42 is permitted to move to the right for a distance equal to the length of the slot 44 before the movement of the rod is effected. In like manner, the piston 42 is permitted to move to the left this same distance from its dotted position before the movement of the rod is effected from this position.

In order to effect the movement of the throttle valve 30 from the idling speed position to the full speed position, a spring 46 is provided within the cylinder 36 and is disposed between the cap 39 and the piston 42. While the spring 46 is preferably disposed within the cylinder 36, as illustrated, it will be readily apparent that it may be positioned at various other locations to effect the movement of the throttle valve 30 from the idling-speed position to the full-speed position. However, for simplicity of construction it is preferable to locate it within the cylinder 36.

With a view to effecting the movement of the piston 42 to move the throttle valve 30 to the idling position, oil from the oil pump 32 is admitted into the cylinder 36 by means of a D-valve 47 which is slidably disposed within a valve chamber 48. The valve chamber 48 is secured to the cylinder 46 by means of suitable bolts 48a in such manner as to cover the large opening 38.

The D-valve 47 is so constructed within the valve chamber 48 that it serves to connect the pipe 34 directly to the cylinder 36 to permit its being filled with oil from the oil pump 32, when the load is removed from the engine. When the load is applied to the engine, the D-valve 47 is moved to the dotted position thereby permitting the oil with which the cylinder 36 has been filled to escape to an exhaust pipe 49. The exhaust pipe 49 may be connected to the crank case or oil reservoir of the engine 10 in order that the oil which has been used in the cylinder 36 may be returned to the lubricating system. As illustrated, the exhaust pipe 49 is of a relatively large diameter in order to permit the rapid escape of the oil from the cylinder 36.

In order to avoid building up a back pressure between the cap 39 and the piston 42, a drain pipe 50 is connected between this space and the exhaust pipe 49. In like manner, a similar drain pipe 50a is connected between the valve chamber 48 and the exhaust pipe 49, as illustrated, to relieve any back pressure which may be built up by the movement of the D-valve 47.

In order to control the operation of the D-valve 47 in accordance with the load which is driven by the engine 10, an armature 51 is provided which is connected to the D-valve 47 by means of a connecting rod 52. The armature 51 is slidably disposed within a solenoid 53 and is biased against the force exerted by the solenoid by means of a spring 54.

With a view to effecting the movement of the D-valve 47 and thereby controlling the movement of the throttle valve 30 in accordance with the load driven by the engine 10, the solenoid 53 may be connected in shunt circuit relation with the series field winding 16, as shown in Fig. 1. However, it will be readily apparent that a solenoid 53 may be connected in shunt circuit relation with the resistor 18, the impedance coil 19 or both of them in series circuit relation as may be desired.

When the solenoid 53 is connected to the series field winding 16, as illustrated, it will be readily understood that it will be responsive to the current flow in the welding circuit. However, it will be readily apparent that the solenoid 53 may be connected across the welding circuit to be responsive to the change in voltage from open circuit to the voltage which is obtained during the welding operation.

It will be observed that the position of the piston 42 when the throttle valve 30 is in the full-speed position, is illustrated by means of the dotted lines showing the piston 42 near the closed end 37 of the cylinder 36. The magnitude of the space between the piston 42 and the closed end 37 and the rate of oil flow are factors which control the time interval which must elapse before the throttle valve 30 begins to move to the idling speed position. The space may be varied by changing the length of the slot 44 to permit a greater or lesser travel of the piston 42 before it is effective to move the rod 40, thereby causing a corresponding movement of the throttle valve 30.

In describing the operation of the automatic throttle controller, it will be assumed that the throttle valve 30 is in the idling-speed position and that the piston 42 and the D-valve 47 are in the positions illustrated in Fig. 2 of the drawing.

On application of load to the engine 10, which in this instance is applied by touching the welding electrode 21 to the work 20 to draw the welding arc and thereby establish a current flow through the series field winding 16, the solenoid 53 is energized.

The energization of solenoid 53 causes the armature 51 to move against the biasing force of the spring 54, thereby moving the D-valve 47 to the dotted position in the valve chamber 48. The oil within the cylinder 36 is then permitted to escape very rapidly through the opening 38 into the exhaust pipe 49 because of the pressure exerted by means of the piston 42 actuated by the spring 46 in addition to the force of gravity.

Since the escape of the oil from the cylinder 36 takes place at a very rapid rate, the throttle valve 30 is moved to the full-speed position within a very short time after a load is applied to the engine 10 and the piston 42 has moved a distance equal to the length of the slot 44 to effect the movement of the rod 40. Therefore, the engine 10 is permitted to pick up the load with a minimum loss of time.

When, for any reason, the load is removed from the engine 10 as, for instance, when the operator removes the welding electrode 21 from within arcing distance of the work 20, the solenoid 53 becomes de-energized, thereby permitting the movement of the armature 51 and the D-valve 47 to the left under the influence of the spring 54. The cylinder 36 is then connected directly to the oil pump 32 through the pipe connection 34, oil begins to fill it, and the piston 42 is moved to the left.

If the load is not applied to the engine 10 before the piston 42 has moved to the left a distance equal to the length of the slot 44, the piston 42 will continue to move to the left thereby compressing the spring 46 and moving the throttle valve 30 to the idling-speed position. However, if the load is applied before the piston has moved a distance equal to the length of the slot 44, the D-valve 47 again is moved to the right, thereby permitting the oil which has been admitted into the cylinder 36 to be exhausted through the exhaust pipe 49.

The time for filling the space between the piston 42, the closed end 37 of the cylinder 36 and for effecting the movement of the piston 42 through the distance equal to the length of the slot 44 may be varied or regulated by means of the valve 35 to any desired time interval. As has been set forth hereinbefore, this time interval may be also adjusted by varying the space itself by changing the length of the slot 44.

As will be readily understood, when a fluid such as oil is used for controlling the operation of the control device 33, a very definite time delay may be obtained before the movement of the throttle valve 30 is initiated to the idling-speed position from the full-speed position. This is due to the fact that the oil is relatively incompressible and, therefore, its rate of flow may be adjusted with the utmost nicety.

It will be further observed that the invention may be practiced with any other suitable fluid such as water or the like which may be supplied from any suitable source such as the circulating pump on the engine or from an entirely separate source. It will also be apparent that, in some instances, air pressure may be used for controlling the operation of the throttle controller, although it is preferred to use a relatively incompressible fluid. In order to obtain the utmost constancy of operation, it is preferable to utilize a fluid which is supplied at a constant pressure. However, it will be evident that some variation in the pressure may be tolerated without material deviation from the desired operation of the apparatus.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. Speed control apparatus for an internal-combustion engine comprising, in combination, a throttle valve for controlling the flow of fuel to the engine, a cylinder having a relatively large opening to permit the flow of oil therethrough, a piston slidably disposed within the cylinder and operatively connected to the throttle valve, resilient means for biasing the piston toward the closed end of the cylinder to effect the movement of the throttle valve from an idling-speed position to a full-speed position, a valve chamber secured to the cylinder and covering said opening therein, a drain pipe of relatively large diameter connected to the valve chamber, an oil pump having driving connection with the engine, an inlet pipe of relatively small diameter connecting the oil pump with the valve chamber, a valve in the inlet pipe for regulating the flow of oil therethrough, a D-valve slidably disposed within the valve chamber to effect the connection of the inlet pipe to the cylinder in a first position for admitting oil to operate the piston to the idling-speed position and to effect the connection of the exhaust pipe to the cylinder in a second position for exhausting the oil to permit the operation of the piston to the full-speed position, an armature operatively connected to the D-valve, a solenoid for controlling the operation of the armature and connected to be responsive to a characteristic of the load driven by the engine to effect the movement of the D-valve to the second position on application of load to the engine and to the first position on removal of load from the engine.

2. Speed control apparatus for an internal-combustion engine comprising, in combination, a throttle valve for controlling the flow of fuel to the engine, a cylinder having a relatively large opening to permit the flow of oil therethrough, a piston slidably disposed within the cylinder and operatively connected to the throttle valve, resilient means for biasing the piston toward the closed end of the cylinder to effect the movement of the throttle valve from an idling-speed position to a full-speed position, there being a predetermined space between the piston and the closed end of the cylinder when the piston is in the full-speed position, a valve chamber secured to the cylinder and covering said opening therein, a drain pipe of relatively large diameter connected to the valve chamber, an oil pump having driving connection with the engine, an inlet pipe of relatively small diameter connecting the oil pump with the valve chamber, a valve in the inlet pipe for regulating the flow of oil therethrough, a D-valve slidably disposed within the valve chamber to effect the connection of the inlet pipe to the cylinder in a first position for admitting oil to operate the piston to the idling-speed position and to effect the connection of the exhaust pipe to the cylinder in a second position for exhausting the oil to permit the operation of the piston to the full-speed position, an armature operatively connected to the D-valve, a solenoid for controlling the operation of the armature and connected to be responsive to a characteristic of the load driven by the engine to effect the movement of the D-valve to the second position on application of load to the engine and to the first position on removal of load from the engine.

3. Speed-control apparatus for an internal-combustion engine connected to drive an electric generator comprising, in combination, a throttle valve for controlling the flow of fuel to the engine; oil pressure means for controlling the operation of the throttle valve including a cylinder provided with a relatively large exhaust port, a piston slidably disposed within said cylinder, means for operatively connecting the piston to the throttle valve, resilient means for biasing the throttle valve to the open position, and a valve adapted to close the exhaust port; a source of oil pressure connected to continually supply oil to said oil pressure means at a relatively slow rate to fill said cylinder and thereby operate said piston to close said throttle valve, and control means connected to be responsive to the output of said generator for opening said valve on application of load to permit the rapid exhaustion of oil from said cylinder and for closing said valve on removal of load.

4. Speed-control apparatus for an internal-combustion engine connected to drive an electric generator comprising, in combination, a throttle valve for controlling the flow of fuel to the engine; liquid pressure means for controlling the operation of the throttle valve including a cylinder provided with a relatively large exhaust port, a piston slidably disposed within said cylinder, means for operatively connecting the piston to the throttle valve, resilient means for biasing the throttle valve to a first position, and a valve disposed to close the exhaust port; a source of liquid pressure connected to continually supply liquid to said liquid pressure means at a relatively slow rate to fill said cylinder and thereby operate said piston to move the throttle valve to a second position, and control means connected to be responsive to a characteristic of the output of said generator for opening said valve on application of load to permit the rapid exhaustion of liquid from said cylinder and for closing said valve on removal of load.

JOHN H. BLANKENBUEHLER.